United States Patent
Underwood et al.

(10) Patent No.: US 7,796,011 B2
(45) Date of Patent: Sep. 14, 2010

(54) WATER TREATMENT APPARATUS

(75) Inventors: Lee Underwood, High Wycombe (GB); Jonathan Fleisig, High Wycombe (GB)

(73) Assignee: OTV SA, Cedex (FR)

( * ) Notice: Subject to any disclaimer, the term of this patent is extended or adjusted under 35 U.S.C. 154(b) by 845 days.

(21) Appl. No.: 10/568,294

(22) PCT Filed: Sep. 9, 2004

(86) PCT No.: PCT/GB2004/003822

§ 371 (c)(1),
(2), (4) Date: Mar. 13, 2006

(87) PCT Pub. No.: WO2005/031546

PCT Pub. Date: Apr. 7, 2005

(65) Prior Publication Data

US 2006/0235572 A1    Oct. 19, 2006

(30) Foreign Application Priority Data

Sep. 26, 2003   (GB) ................................ 0322601.6

(51) Int. Cl.
*H04L 9/32* (2006.01)
*G06K 19/00* (2006.01)
*G06K 5/00* (2006.01)
*B67B 7/00* (2006.01)
*B67D 1/00* (2006.01)
*B01D 15/00* (2006.01)
*B01D 35/00* (2006.01)

(52) U.S. Cl. .............. 340/5.6; 340/5.22; 340/5.26; 340/5.28; 340/5.85; 222/190; 222/1; 222/55; 222/129; 210/669; 210/90

(58) Field of Classification Search ............... None
See application file for complete search history.

(56) References Cited

U.S. PATENT DOCUMENTS

| | | | | |
|---|---|---|---|---|
| 4,969,991 A * | 11/1990 | Valadez | ................. | 210/96.2 |
| 5,674,381 A * | 10/1997 | Den Dekker | ................. | 210/85 |
| 6,380,637 B1 * | 4/2002 | Hsu et al. | ................. | 290/1 R |
| 6,606,260 B2 * | 8/2003 | Ahlstrom | ................. | 363/125 |
| 7,048,775 B2 * | 5/2006 | Jornitz et al. | ................. | 95/1 |
| 7,281,409 B2 * | 10/2007 | Baumfalk et al. | ................. | 73/38 |
| 7,441,664 B2 * | 10/2008 | Tanner et al. | ................. | 210/436 |
| 2003/0003865 A1 * | 1/2003 | Defosse et al. | ................. | 455/41 |
| 2004/0256328 A1 * | 12/2004 | Jornitz et al. | ................. | 210/739 |

OTHER PUBLICATIONS

Verschuren, T.: "Smart access: strong authentication on the Web"; Computer Networks and ISDN Systems, North Holland Publishing. Amsterdam, NL, vol. 30, No. 16-18, Sep. 30, 1998 pp. 1511-1519.

(Continued)

*Primary Examiner*—Daniel Wu
*Assistant Examiner*—Fekadeselassie Girma
(74) *Attorney, Agent, or Firm*—Drinker Biddle & Reath LLP

(57) ABSTRACT

A water treatment apparatus programmable pass key comprising a data carrier programmed with one or more predetermined codes, each code relating to an operation in or of the water treatment apparatus.

19 Claims, 1 Drawing Sheet

OTHER PUBLICATIONS

"Proximity Activated Computer Console Lock", IBM Technical Disclosure Bulletin, IBM Corp. New York, US, vol. 35, No. 6, Nov. 1, 1992, pp. 173-176.

Spesivtsev, A. et al: "Smart card, computer security, access control, cryptology", Security Technology, 1993 Security Technology, Proceedings, Institute of Electrical and Electronics Engineers 1993, Int'l Carnahan Conference on Ottawa, Ont., Canada Oct. 13-15, 1993, New York, NY, USA, IEEE, Oct. 13, 1993, pp. 157-158.

Kolokotsa, D. et al.: "Interconnecting smart card system with PLC controller in a local operating network to form a distributed energy management and control system for buildings"; Energy Conversion and Management, Elsevier Science Publishers, Oxford, GB, vol. 43, No. 1, Jan. 2002, pp. 119-134.

Husemann, D.: "Standards in the smart card world", Computer Networks, Elsevier Science Publishers B.V., Amsterdam, NL, vol. 36, No. 4, Jul. 16, 2001, pp. 473-487.

Diem, W.: "Smart Card Opens the Door", Auto Technology, Vieweg Publishing, Wiesbaden, DE, vol. 1, No. 1, Feb. 2001, pp. 32-33.

Kosugi, K.: "Trend of Smart Card (IC Card) In Security Fields in Japan", NEC Research and Development, Nippon Electric Ltd. Tokyo, JP, vol. 43, No. 3, Jul. 2002, pp. 208-212.

* cited by examiner

WATER TREATMENT APPARATUS

FIELD OF THE INVENTION

The present invention relates to a water treatment apparatus programmable pass key.

BACKGROUND

Water treatment apparatus including for example ultra-pure treatment and filtration apparatus for laboratory, medical, clinical, research and other uses, are becoming increasingly sophisticated. Thus the need to ensure correct operation of such apparatus also requires to keep in step.

However, operation of such apparatus is still commonly accessible by any user whether trained or untrained. It is increasingly not desired to allow untrained users to carry out any significant resetting or re-operation of water treatment apparatus. This includes such operations as 'sanitisation'.

Sanitisation of water treatment apparatus is an important operation, and its incorrect operation, such as conducting the operation too frequently or too infrequently, or whilst other operations are ongoing, can lead to significant damage to the apparatus and/or water product therefrom.

SUMMARY OF THE INVENTION

It is an intention of the present invention to obviate these disadvantages.

It is also possible to control water treatment apparatus from more than one access point for either display and/or control, with these access points being in separate or different locations. It is desired to have improved safety levels across the system to reduce the possibility of errors due to overlapping control.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

Referring to FIG. 1, a schematic representation of a water treatment apparatus 10 and pass key 12 combination is depicted. The water purification apparatus includes a place 14 for the key to be inserted in one embodiment. The electrical circuit 16 in the host water treatment apparatus is depicted by dashed lines. FIG. 2 shows an embodiment of the water treatment apparatus 10 with two remote locations 20, 22 that are electronically connected with the one in the main housing of the water treatment apparatus.

DETAILED DESCRIPTION OF THE INVENTION

Figure 1:
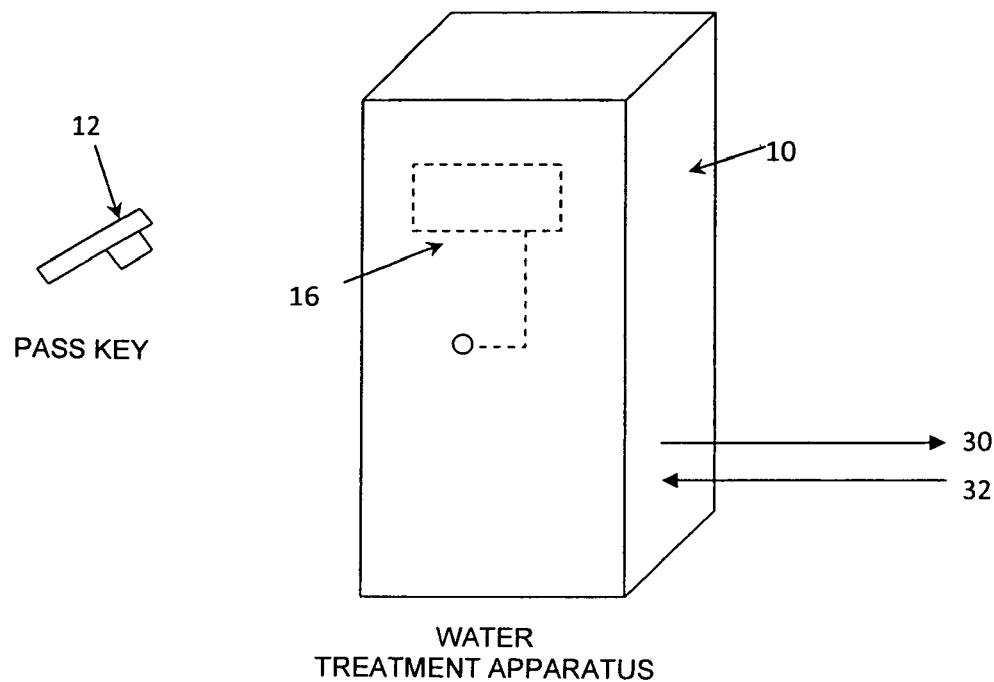
FIG. 1 is a schematic representation of a water treatment apparatus and pass key combination according to one aspect of the present invention.
Figure 2:
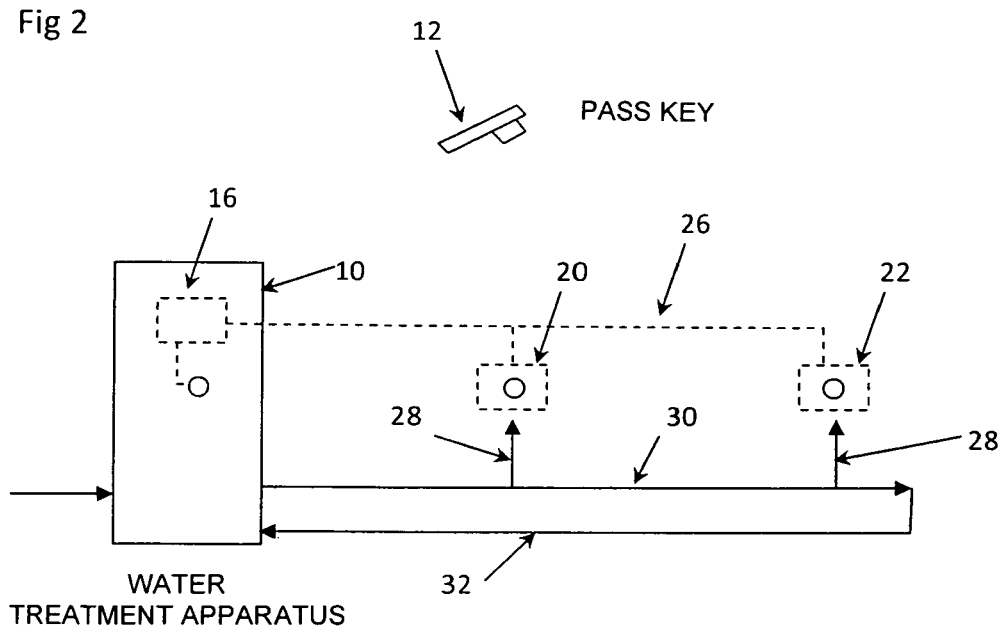
FIG. 2 is a schematic representation of a water treatment apparatus and pass key combination according to another aspect of the present invention.

Thus, according to one aspect of the present invention, there is provided a water treatment apparatus programmable pass key comprising a data carrier programmed with one or more predetermined codes, each code relating to an operation in or of the water treatment apparatus.

The pass key could have any suitable size, shape or design, including the design and style of other programmable keys such as for tools, cars, computers or other technical equipment. Generally such keys are usable with one hand, and are adapted to be easily storable.

The data carrier may be any form of programmable data carrier known in the art, generally including a computer chip or chips.

The operation(s) of the water treatment apparatus include all those known in the art, including any type of treatment of water, such as filtration, sanitisation or recirculation, and any type of reprogramming of the water treatment apparatus to provide different flow rates, levels of filtration, etc, as well as servicing operations of the apparatus.

The term "water treatment apparatus" as used herein includes a complete or stand-alone apparatus, as well as components or parts or fittings of water treatment apparatus, such as individual treatment units or replaceable or consumable parts such as a resin cartridge, as well as multi-site apparatus having more than one user or user-operable interface.

The latter apparatus can often be in different rooms or even buildings, often leading to complications where different users are using the same apparatus at the same time, but desiring different operations therefrom. The pass key of the present invention ensures that certain operations such as sanitisation can be limited to one or more authorised users.

Multiple access points 20, 22 may be connected across a network 26 as known in the art, such as via an RS485 connection across a Local Area Network (LAN). Each access point may be individually programmed to have access to different operations, display screens or alarms 28. The access points may be configured to only allow one controller to be used at any time or may indicate the location of any network activity.

It may further be preferable to limit the location of activation of certain operations, such as sanitisation, to certain control points such as the location of chemical addition or storage.

The pass key 12 of the present invention is preferably separable from the water treatment apparatus 10, and so includes an electronic circuit which can co-operate with an electronic circuit 16 in the host water treatment apparatus 10. The co-operation of the pass key and water treatment apparatus may be one way 30, either from the pass key to the apparatus or vice-versa, or two way 32.

The pass key and the water treatment apparatus can communicate via any form of transmittable waveform, analogue or digital, including optical and magnetic contacts. Preferably these circuits communicate by physical electrical contact for maximum robustness and confirmation of connection, and to minimise interference by other means of communication. Preferably co-operation of the circuits is only possible when the communication is correctly created, and this is only achieved when the pass key is correctly connected, installed and/or fitted with the host water treatment apparatus.

Such keys are known in the art, for example from Dallas Semiconductor Corp. (Dallas Tex., USA). Their key is scanned and the correct type is confirmed before the serial number stored in the non volatile memory is checked prior to allowing access to the functions programmed for that device.

The pass key preferably includes a memory capacity and an ability to read/interrogate the water treatment apparatus, and/or vice versa.

The pass key may also include a database having relevant data relating to the water treatment apparatus such as validation information, process information, and/or manufacturing information. Typical information includes, but is not limited to, date of manufacture, date of the or each servicing and/or testing and/or other operation, the user, process parameters and data, quality control details, and possibly a unique reference code.

Thus, the present invention extends to a water treatment apparatus programmable pass key as herein before defined in combination with a water treatment apparatus adapted to receive and read the pass key.

The or each code of the pass key may include an enablement signal to the water treatment apparatus which signal may include means for the user to uniquely control one or more different operations of the water treatment apparatus.

The pass key or one or more codes in the pass key may be time-dependent, so as to require renewal or reactivation after a certain time. The certain time could be a predetermined time period wherein the user requires retraining on the water treatment apparatus, or the apparatus requires different operations, and the like.

Different pass keys could be usable on the same water treatment apparatus, but each pass key could have a different number and/or type of code according to different types of access allowed by types of different users, such as laboratory personnel and service engineers.

The pass key of the present invention obviates the need for pass words or pin numbers commonly used in the art to gain access through a key board or key pad to technological apparatus, and can ensure that only authorised personnel can adjust key operating parameters, such as alarm conditions, auto-restart, etc.

The pass key may also allow access to operational data such as hours operated, number of stop/starts, sanitisations and the like.

The pass key can also instruct that only key personnel, perhaps those who have only had the appropriate training, can initiate activities such as system cleaning and sanitisation. As chemicals or sanitisation agents can be pumped for some distance through the complete network of pipes and outlets for some types of water treatment apparatus, it is an essential safety aspect that only qualified personnel undertake this activity, and in such a way as to avoid conflict with simultaneous operators or users.

The pass key of the present invention could also ensure that for an operation such as cleaning and/or sanitisation, such a process can only proceed upon presentation of the key. In many present water treatment apparatus, sanitisation is carried out by the manual introduction of relevant chemicals as and when desired, without any ability of the water treatment apparatus to inhibit any user from carrying out the operation when unnecessary.

The cleaning and/or sanitisation process could include recirculation of the chemicals or sanitants, reduction of reservoirs levels, discharge to drains, rinsing with fresh water, all in an automatic process, such that down time of the apparatus is minimised due to the use of self-draining reservoirs with no hideout areas, deadlegs, etc.

Where there are more than one display or control stations, the current operation regime can be displayed and in certain circumstances, such as during a sanitisation, local operation or control can be inhibited. Alternatively certain operations may be prevented from initiation by the distant access point.

A further advantage of the present invention is that it can be time coded, such that after a pre-set time, possibly installed during programming of the pass key, it would become inoperable. Thus for instance, this could be a signal that the pass key holder must attend ongoing product training at pre-determined intervals to ensure their knowledge of the product is kept up to date and their skill codes revalidated.

The present invention extends to a method of operating a water treatment apparatus, wherein one or more operations of the water treatment apparatus are only operable by conjunction of a programmable pass key as herein before defined with the water treatment apparatus, said pass key having a or the code adapted to operate the or each operation.

The invention claimed is:

1. A water treatment apparatus programmable pass key and a water treatment apparatus for reading the pass key when the pass key is in communication with the apparatus, the pass key being separable from the water treatment apparatus and be physically held and operable by a user during use, the water treatment apparatus being a stand-alone unit that configured to receive and be activated by one or more external pass keys, the pass key comprising a data carrier programmed with one or more predetermined codes, each code relating to an operation in or of the water treatment apparatus; the pass key being connectable to the water treatment apparatus from outside the unit without the removal of any components of the water treatment apparatus; wherein one of the codes is programmed to allow the user to service the water treatment apparatus after the pass key communicates with the water treatment apparatus and prevents servicing without the pass key first having been in communication with the water treatment apparatus.

2. A pass key and apparatus combination as claimed in claim 1 wherein the data carrier is programmable.

3. A pass key and apparatus combination as claimed in claim 1 wherein the operation comprises sanitization.

4. A pass key and apparatus combination as claimed in claim 1 wherein the water treatment apparatus has multiple access points.

5. A pass key and apparatus combination as claimed in claim 1 wherein the pass key includes a memory capacity and an ability to read/interrogate the water treatment apparatus and/or vice versa.

6. A pass key and apparatus combination as claimed in claim 5, wherein the pass key contains data relating to the water treatment apparatus.

7. A pass key and apparatus combination as claimed in claim 1 wherein the pass key is time coded such that it is only operational for communicating with the water treatment apparatus for a preset time period.

8. A pass key and apparatus combination as claimed in claim 1 wherein the apparatus is accessible in more than one location.

9. A pass key and apparatus combination as claimed in claim 8, wherein the pass key includes electronic circuits which can communicate with electronic circuits within the water treatment apparatus.

10. A pass key and apparatus combination as claimed in claim 9, wherein said electronic circuits communicate via transmittable waveforms.

11. A pass key as claimed in claim 9, wherein said electronic circuits communicate by physical contact.

12. A pass key and apparatus combination as claimed in claim 6, wherein the data includes at least one of validation information, process information and manufacturing information.

13. A pass key and apparatus combination as claimed in claim 10, wherein the transmittable waveforms are selected from a group consisting of optical, electromagnetic and magnetic contacts.

14. A pass key and apparatus combination as claimed in claim 1, wherein the water treatment apparatus is configured so that the pass key can be connected, installed and/or fitted into the water treatment apparatus in order for the pass key to communicate with the water treatment apparatus.

15. A pass key and apparatus combination as claimed in claim 3 wherein sanitizing chemicals can be circulated through the apparatus only after the pass key communicates with the water treatment apparatus.

16. A pass key and apparatus combination as claimed in claim 1 wherein the water treatment apparatus includes a sanitizing function, and wherein the water treatment apparatus is programmed to disable the sanitizing function until only after a pass key communicates with the water treatment apparatus to enable the sanitizing function, the water treatment apparatus disabling the sanitizing function after sanitizing is complete.

17. A pass key and apparatus combination as claimed in claim 1 wherein the water treatment apparatus includes multiple functions, some of which are disabled, and wherein the water treatment apparatus is programmed to prevent use of the disabled functions until a pass key first communicates with the water treatment apparatus to enable one or more of the disabled functions, the water treatment apparatus programmed to detect whether the pass key is authorized to enable the disabled function.

18. A pass key and apparatus combination as claimed in claim 17 wherein the water treatment apparatus is configured to communicate with multiple pass keys, and wherein not all disabled functions can be enabled by the same pass key, the water treatment apparatus enabling only select disabled functions that are associated with a particular pass key that is first brought into communication with the water treatment apparatus.

19. A pass key and apparatus combination as claimed in claim 18 wherein the pass key includes a timed deactivation code that deactivates the ability of the pass key to activate certain functions on the water treatment, the pass key capable of being reactivated from an external source.

* * * * *